(12) United States Patent
Kanayama et al.

(10) Patent No.: US 9,826,765 B2
(45) Date of Patent: Nov. 28, 2017

(54) DRIED NOODLE AND PROCESS FOR PRODUCING THE SAME

(71) Applicants: Junya Kanayama, Tokyo (JP); Hisashi Sugiyama, Tokyo (JP); Masafumi Yamakoshi, Tokyo (JP); Taku Ogura, Tokyo (JP)

(72) Inventors: Junya Kanayama, Tokyo (JP); Hisashi Sugiyama, Tokyo (JP); Masafumi Yamakoshi, Tokyo (JP); Taku Ogura, Tokyo (JP)

(73) Assignee: TOYO SUISAN KAISHA, LTD., Tokyo (JP)

( * ) Notice: Subject to any disclaimer, the term of this patent is extended or adjusted under 35 U.S.C. 154(b) by 0 days.

(21) Appl. No.: 13/728,118

(22) Filed: Dec. 27, 2012

(65) Prior Publication Data

US 2013/0115359 A1 May 9, 2013

Related U.S. Application Data

(63) Continuation of application No. PCT/JP2011/065199, filed on Jul. 1, 2011.

(30) Foreign Application Priority Data

Jul. 1, 2010 (JP) .................................. 2010-151360

(51) Int. Cl.
*A23L 1/16* (2006.01)
*A23L 1/162* (2006.01)
*A23L 7/113* (2016.01)

(52) U.S. Cl.
CPC .............. *A23L 1/162* (2013.01); *A23L 7/113* (2016.08)

(58) Field of Classification Search
CPC ................................. A23L 1/162; A23L 7/113
USPC ........................................................ 426/557
See application file for complete search history.

(56) References Cited

U.S. PATENT DOCUMENTS

| | | | |
|---|---|---|---|
| 4,368,210 A | | 1/1983 | Murakami et al. |
| 4,590,083 A | * | 5/1986 | Hatsugai et al. ............. 426/557 |
| 4,783,339 A | * | 11/1988 | Horner ........................... 426/557 |
| 5,543,168 A | * | 8/1996 | Yamasaki et al. ............ 426/557 |
| 6,482,461 B1 | * | 11/2002 | Teh et al. ....................... 426/557 |
| 2011/0229613 A1 | | 9/2011 | Takizawa et al. |
| 2013/0115359 A1 | | 5/2013 | Kanayama et al. |

FOREIGN PATENT DOCUMENTS

| | | |
|---|---|---|
| CA | 928138 A1 | 6/1973 |
| CN | 101048075 B | 12/2010 |
| CN | 102933094 B | 4/2015 |

(Continued)

OTHER PUBLICATIONS

Chinese Office Action dated Jun. 28, 2013 (and English translation thereof) issued in Chinese Application No. 2011-80027683.4, which is a counterpart Chinese application of related U.S. Appl. No. 13/728,118.

(Continued)

*Primary Examiner* — Katherine D Leblanc
(74) *Attorney, Agent, or Firm* — Holtz, Holtz & Volek PC

(57) ABSTRACT

Provided is a dried noodle having a porosity in the cross-sectional area of the noodle of from 0.1 to 15%, a unit porosity in the cross-sectional area of the noodle of from 0.01 to 1%, a gelatinization degree of 30 to 75% and a porous structure.

5 Claims, 2 Drawing Sheets

(56) References Cited

FOREIGN PATENT DOCUMENTS

| JP | 485027 | 2/1973 |
|---|---|---|
| JP | S485026 | 2/1973 |
| JP | 52-128251 | 10/1977 |
| JP | 52128251 A | 10/1977 |
| JP | 5245776 B1 | 11/1977 |
| JP | 53-6444 | 1/1978 |
| JP | 53032142 A | 3/1978 |
| JP | 56039614 B2 | 9/1981 |
| JP | 58081749 A | 5/1983 |
| JP | 58216655 A | 12/1983 |
| JP | 5925655 A | 2/1984 |
| JP | 59025655 A | 2/1984 |
| JP | 59-63152 A | 4/1984 |
| JP | 59063152 A | 4/1984 |
| JP | 69095854 A | 6/1984 |
| JP | 69120079 U | 7/1984 |
| JP | 59173060 A | 9/1984 |
| JP | 60105466 A | 6/1985 |
| JP | 62158467 A | 7/1987 |
| JP | 05049423 A | 3/1993 |
| JP | 05292908 A | 11/1993 |
| JP | 06343409 A | 12/1994 |
| JP | 07132060 A | 5/1995 |
| JP | 07246070 A | 9/1995 |
| JP | 08000041 B2 | 1/1996 |
| JP | 08009908 A | 1/1996 |
| JP | 08337726 A | 12/1996 |
| JP | 10117715 A | 5/1998 |
| JP | 11196799 A | 7/1999 |
| JP | 2000032935 A | 2/2000 |
| JP | 2000093106 A | 4/2000 |
| JP | 2003102413 A | 4/2003 |
| JP | 2004222546 A | 8/2004 |
| JP | 2004337156 A | 12/2004 |
| JP | 2005065505 A | 3/2005 |
| JP | 2005318803 A | 11/2005 |
| JP | 2006122020 A | 5/2006 |
| JP | 2006246773 A | 9/2006 |
| JP | 2006-288239 A | 10/2006 |
| JP | 2007049952 A | 3/2007 |
| JP | 2007222139 A | 9/2007 |
| JP | 5172027 B2 | 3/2013 |
| JP | 6190148 B2 | 4/2013 |
| WO | WO 00/18255 A1 | 4/2000 |
| WO | WO 2006/049267 A1 | 5/2006 |
| WO | 2010055860 A1 | 5/2010 |

OTHER PUBLICATIONS

International Search Report dated Sep. 20, 2011 (in English) in counterpart International Application No. PCT/JP2011/065199.
International Preliminary Report on Patentability (IPRP) dated Feb. 21, 2013 (in English) issued in parent International Application No. PCT/JPO2011/065199.
Chinese Office Action dated Feb. 12, 2014 (and an English-language translation thereof) issued in Chinese Application No. 2011-80027683.4.
Hitotsubashi-Shuppan Co. Ltd, "New Food Composition Tables—Fifth Edition", Mar. 15, 2001, 10-23.
Japanese Office Action (and English translation thereof) dated Aug. 18, 2015, issued in counterpart Japanese Application No. 2014-129618.
Korean Office Action (and English translation thereof) dated May 19, 2016, issued in counterpart Korean Application No. 10-2012-7031510.
Certificate of Experimental Result by Nissin Foods Holdings Co., Ltd., Dec. 10, 2014.
Homepage of Myojo Foods Co., Ltd; URL:https://web.archive.org/web/20040703004508/http://www.myojofoods.co.jp/index2.html.
Japanese Office Action dated Aug. 30, 2012, issued in counterpart Japanese Application No. 2012-522717.
"Japanese-Born World Food! All about Istant Ramen", Japan Food Journal Co., Ltd. 1st Edition, Dec. 20, 2014.
Written Opinion of the International Searching Authority (in English) dated Sep. 20, 2011, issued in parent International Application No. PCT/JP2011/065199.
Written Statement for the Patent Application of Japanese Patent No. 2014-129618.
Written Statement for the Patent Application of Japanese Patent No. 5172027.
Ohisa, et al., Bulletin of Akita Research Institute of Food and Brewing, pp. 58-60, 2003.
Ohisa, et al., "Effect of Cavities on Hardness of Boiled Inaniwa-udon (Hand-stretched wheat noodles)", Nippon Shokuhin Kagaku Kaishi, vol. 53, No. 2, pp. 91-95, Feb. 2006.
Ohisa, et al., "Effects of Dimensions and Internal Cavity of Dry Udon on Sodium Chloride Elution", Nippon Shokuhin Kagaku Kogaku Kaishi vol. 49, No. 8, pp. 547-550, Aug. 2002.
Shibasaki, "Studies on the Manufacture of Tenobe-Udon: Absorption of Water and Changes of the Structure of the Noodle under Boiling", Report of the Food Research Institute and Fermentation & Food Experimental Station, Kanagawa Prefectural Government, No. 88, pp. 32-34, Nov. 1996.
Takahashi, "Knowledge of Starch Product", pp. 64-65, Saiwai Shobo, May 2006.
Vietnamese Office Action (and English translation thereof) dated Mar. 29, 2016, issued in counterpart Vietnamese Application No. 1-2012-03914.
Indonesian Office Action (and English translation thereof) dated Jun. 17, 2015, issued in counterpart Indonesian Application No. W-00 2012 05456.
Mexican Office Action (and English translation thereof) dated Jul. 19, 2016, issued in counterpart Mexican Application No. 2012/015263.
Homepage of Myojo Foods Co., Ltd; URL:https://web.archive.org/web/20040703004508/http://www.myojofoods.co.jp/index2.html; downloaded on Nov. 20, 2014.
"Japanese-Born World Food! All about Instant Ramen", Japan Food Journal Co., Ltd. 1st Edition, Dec. 20, 2014.
"200 Million Packages Sold Within a Year of Its Release! Secrets of Maruchan Seimen Noodles", President Online, http://president.jp/articles/-/9360, pp. 1-5.
"50 Years of Competition and Cooperation", 50th Anniversary of Foundation Memorial Edition Editors Committee (Instant Noodle Dietary Education Promoting Committee), Japan Instant Food Industrial Association, pp. 98-117.
Certificate of Experimental Results by Nissin Foods Holdings Co., Ltd. (3 pages).
Certificate of Experimental Results by Nissin Foods Holdings Co., Ltd., Sep. 16, 2015 (2 pages) (which depicts Fig. 2 I of JP 48-5027).
Certificate of Experimental Results by Nissin Foods Holdings Co., Ltd., Sep. 16, 2015 (3 pages) (which depicts Fig. 1 of JP 11-196799).
Certificate of Experimental Result by Nissin Foods Holdings Co., Ltd., Oct. 5, 2015 (pp. 1-4 and Fig.).
webpage of the Food and Agricultural Materials Inspection Center (FAMIC) showing a gelatinization measuring method, Oct. 28, 2015, http://www.famic.go.jp/ffis/feed/index.html.
"Glucose CII-Test Wako (Mutarotase-GOD method) Attachment", Wako pure Chemical Industries, Ltd., prepared Sep. 2007, revised Mar. 2008, pp. 1-3.
"Internet article relating to Maruchan Seimen" by Toyo Keizai Online, Mar. 29, 2013, http://toyokeizai.net/articles/print/13455, pp. 1-4.
"Japan Agricultural Standard for Dried Noodle", Notification No. 653, last revision May 15, 2014.
"Maruchan Seimen", Toyo Suisan, Japan Quality Review, Feb. 2013.
Photographs and measurement result of the porosity and unit porosity of the product "Maruchan Seimen" sold by the assignor of the present application.
Photographs of the product "Maruchan Seimen" sold by the assignor of the present application.

(56) References Cited

OTHER PUBLICATIONS

Search information of "OHISA et al., Bulletin of Akita Research Institute of Food and Brewing, pp. 58-60, 2003", J-global Science and Technology Link Center Website, http://jglobal.jst.go.jp/detail?JGLOBAL_ID=200902219390207763&q=200902219390207763&t=0.
Takehisa Ando, "Introduction of Dried Noodles (Revised Version)", The Japan Food Journal Co., Ltd., Sep. 30, 1999, pp. 78-79.
Monta ODA, "New: Book of Noodles", Shokuhin Sangyo Shimbunsha; Dec. 25, 2003; pp. 30-37, 47-67, 92-93.
Japanese Office Action (and English translation thereof) dated Feb. 14, 2017 issued in counterpart Japanese Application No. 2016-024737.
Description of Evidence submitted by the Plaintiff, Nissin Foods Holdings Co., Ltd., in a lawsuit in search of the annulment of the trial decision in the Intellectual Property High Court of Japan for Japanese U.S. Pat. No. 5,153,964.
Decision on Opposition dated Apr. 7, 2017 for related Japanese Patent No. JP 5886902 (Japanese Patent Application No. 2014-129618).
Certificate of Experimental Results by Toyo Susian Kaisha, Ltd. dated Mar. 18, 2015.
Demand for Invalidation Trial of Japanese U.S. Pat. No. 5153964 by Nissin Foods Holdings Co., Ltd., dated Dec. 26, 2014.
"Designing Noodle Drying Devices", Journal of the Japanese Society of Agricultural Machinery, vol. 10, No. 4, pp. 113-125, 1948.
"Evaluation of Drying Characteristics for Japanese Noodle (Udon)", Japan Journal of Food Engineering, vol. 4, pp. 115-121, Dec. 2003.
"Food Emulsifier—Basic and Applications", Kabushiki Kaisha Kourin, pp. 15-21, Apr. 1, 1997.
Japanese Patent Office's Advance Notice of Trial Decision dated May 16, 2016 in the Invalidation Trial of Japanese U.S. Pat. No. 5153964.
Japanese Patent Office's Notification about Subjects of Trial Examination dated Oct. 8, 2015 in the Invalidation Trial of Japanese Patent No. 5153964.
Japanese Patent Office's Trial Decision in the Invalidation Trial of Japanese Patent No. 5153964 dated Dec. 7, 2016.
Preparatory Document dated Apr. 14, 2017 submitted by Nissin Foods Holdings Co., Ltd. in the lawsuit in search of the annulment of the JPO's Invalidation Trial decision for Japanese Patent No. 5153964.
Preparatory Document dated Feb. 23, 2017 submitted by Nissin Foods Holdings Co., Ltd. in the lawsuit in search of the annulment of the JPO's Invalidation Trial decision for Japanese Patent No. 5153964.
Record of First Oral Proceedings dated Nov. 30, 2015 in the Invalidation Trial of JP 5153964.
Request for Correction dated Jul. 25, 2016 submitted by Toyo Suisan Kaisha Ltd., in the Invalidation Trial of Japanese Pat. No. 5153964.
Written Preparatory Statement for Oral Proceedings in the Invalidation Trial of Japanese Pat. No. 5153964 by Nissin Foods Holdings Co., Ltd., dated Oct. 23, 2015.
Written Preparatory Statement for Oral Proceedings in the Invalidation Trial of Japanese Pat. No. 5153964 by Toyo Suisan Kaisha, Ltd., dated Nov. 16, 2015.
Written Refutation by Nissin Foods Holdings Co., Ltd., dated Aug. 31, 2016 in the Invalidation Trial of Japanese Pat. No. 5153964.
Written Response by Toyo Suisan Kaisha, Ltd., to the Demand for Invalidation Trial for Japanese Pat. No. 5153964 dated Apr. 27, 2015.
Written Response by Toyo Susian Kaisha, Ltd., dated Oct. 21, 2016 in the Invalidation Trial of Japanese Pat. No. 5153964.
Written Statement by Nissin Foods Holdings Co., Ltd., dated Dec. 14, 2015 issued in the Invalidation Trial of Japanese Pat. No. 5153964.
Written Statement by Toyo Suisan Kaisha Ltd., dated Jul. 25, 2016 in the Invalidation Trial of Japanese Patent No. 5153964.
Written Statement by Toyo Suisan Kaisha, Ltd. dated Dec. 14, 2015 in the Invalidation Trial of Japanese Pat. No. 5153964.
Kojima, et al., "Determination of Sodium and Water Mobility in the Wheat Noodles during Drying Process Using 23 Na and 1 H NMR", Nippon Shokuhin Kagaku Kogaku Kaishi, vol. 43, No. 10, pp. 1098-1104, Oct. 1996.
Oda, "New Noodle Book (4th edition)", pp. 78-85, Shokuhin Sangyo Shimbunsha Co., Ltd., Sep. 15, 1994.
Yasuda, et al., "Knowledge about Oil Products (3rd ed.)", Kabushiki Kaisha Saiwai Shobo, pp. 100-103, 180-185, Feb. 25, 1981.
"Table of Food Composition 2008, 5th Revised and Enlarged Edition, Main Tables", Dec. 1, 2007, 1st version, 1st copy, published by the Woman Nutrition University, Publishing Division.
Third Preparatory Document dated Jul. 7, 2017 submitted to the Intellectual Property High Court of Japan by Nissin Foods Holdings Co., Ltd. in the lawsuit in search of an annulment of the JPO's Invalidation Trial decision for Japanese Pat. No. 5153964.
Preparatory Document dated Jun. 7, 2017 submitted to the Intellectual Property High Court of Japan by Toyo Suisan Kaisha, Ltd., in the lawsuit in search of an annulment of the JPO's Invalidation Trial decision for Japanese Pat. No. 5153964.
Written Expert Opinion dated Jun. 29, 2017 submitted to the Intellectual Property High Court of Japan by Nissin Foods Holdings Co., Ltd. in the lawsuit in search of an annulment of the JPO's Invalidation Trial decision of JP 5153964.
Akira Fujita, "Food Fat and Oil, and Their Applications", Kabushiki Kaisha Saiwai Shobo, Apr. 5, 2000, pp. 150-151.
Japanese Office Action (and English translation thereof) dated Jul. 25, 2017 issued in counterpart Japanese Application No. 2016-024737.
Preparatory Document (4) dated Sep. 13, 2017 submitted to the Intellectual Property High Court of Japan by Nissin Foods Holdings Co., Ltd. in the lawsuit in search of the annulment of the JPO's Invalidation Trial decision for Japanese Patent No. 5153964.
Preparatory Document (2) dated Aug. 31, 2017 submitted to the Intellectual Property High Court of Japan by Toyo Suisan Kaisha Ltd. in the lawsuit in search of the annulment of the JPO's Invalidation Trial decision for Japanese Patent No. 5153964.
"NOF Corporation Catalog", Oct., 2009.
Shizuyuki OHTA, "Deterioration of Oil and Fat Food, and Prevention Thereof", 1st edition, 2nd printing, pp. 44-48, Nov. 5, 1979, Saiwai Shobo Co., Ltd.

\* cited by examiner

DRIED NOODLE AND PROCESS FOR PRODUCING THE SAME

CROSS REFERENCE TO RELATED APPLICATIONS

This application is a Continuation Application of PCT Application No. PCT/JP2011/065199, filed Jul. 1, 2011 and based upon and claiming the benefit of priority from prior Japanese Patent Application No. 2010-151360, filed Jul. 1, 2010, the entire contents of all of which are incorporated herein by reference.

BACKGROUND OF THE INVENTION

1. Field of the Invention

The present invention relates to a dried noodle.

2. Description of the Related Art

Conventionally, with dried noodles, the noodles easily adhere to each other during boiling, and thus a cook needs to stir the noodles during cooking. Furthermore, it is necessary to wash the boiled noodles with water to eliminate a viscid sensation.

Conventional dried noodles are produced by having undergone a drying step for which a long time is required. In general, a raw noodle string is dried under a condition that is close to natural drying at a low temperature of 20 to 60° C. over 2 to 20 hours. In such production process, cracking is produced frequently due to fine changes in the humidity and temperature during drying. Therefore, drying for a long time as mentioned above is essential for preventing cracking of a noodle due to excess evaporation of moisture.

BRIEF SUMMARY OF THE INVENTION

According to the aspects of the present invention, (1) A dried noodle having a porosity in the cross-sectional area of the noodle of from 0.1 to 15%, a unit porosity in the cross-sectional area of the noodle of from 0.01 to 1%, a gelatinization degree of 30 to 75% and a porous structure; and (2) a process for the production of a dried noodle having a gelatinization degree of 30 to 75% as a final gelatinization degree, comprising foaming and drying at 90 to 150° C. a raw noodle body formed from a noodle dough comprising a main raw material and a powder oil, which is entirely derived from an oil, in an amount of more than 0.5% by weight and less than 6% by weight with respect to the total weight of the main raw material;
are provided.

According to the embodiments of the present invention, a dried noodle that can be cooked finely in an easy manner within a short time and a process for the production of the same are provided.

DETAILED DESCRIPTION OF THE INVENTION

The dried noodle according to an embodiment of the present invention has a porosity in the cross-sectional area of the noodle of from 0.1 to 15%, a unit porosity in the cross-sectional area of the noodle of from 0.01 to 1%, a gelatinization degree of 30 to 75% and a porous structure.

Figure 1:
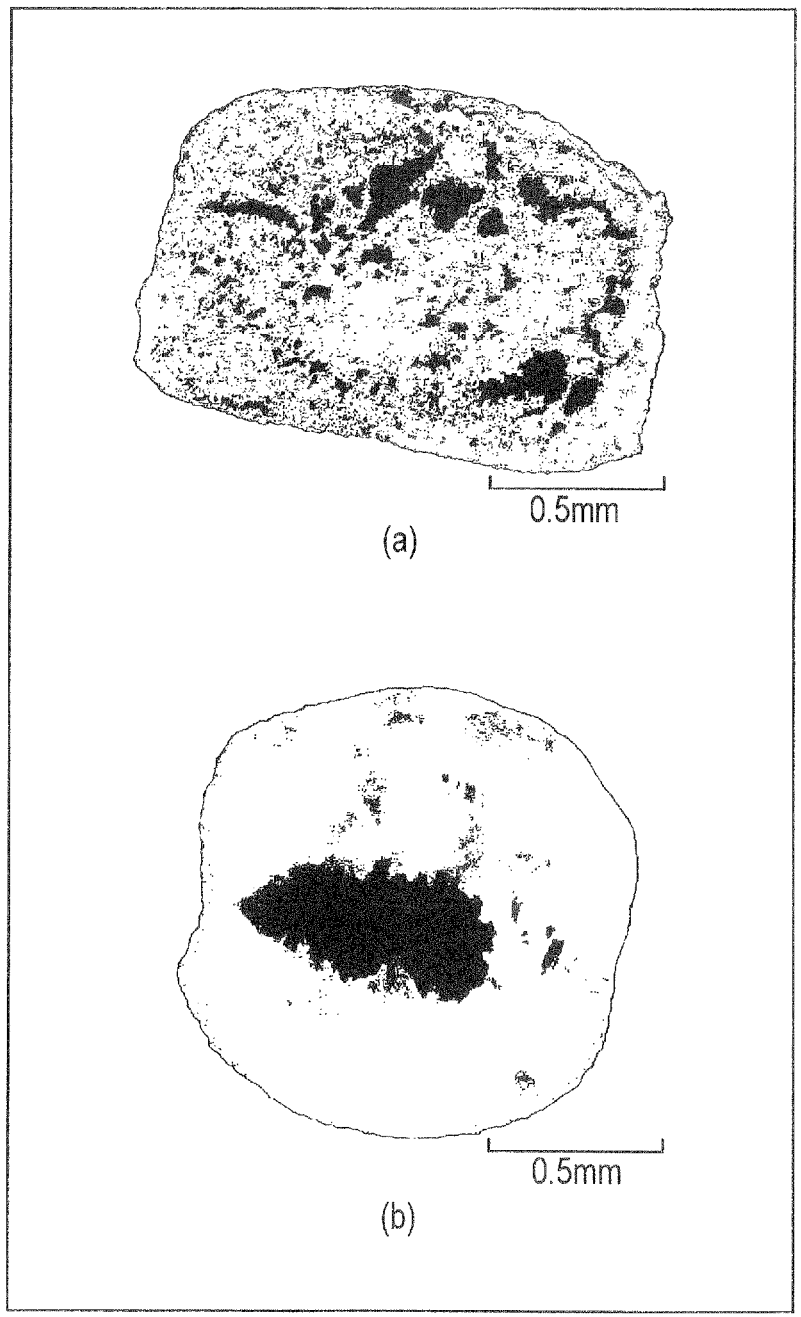
FIG. 1 shows a cross-section of the dried noodle according to an embodiment of the present invention (FIG. 1A) and a cross-section of a conventional noodle (FIG. 1B)

The porous structure in the dried noodle refers to a structure that does not have large voids as in FIG. 1B (shown in black in the drawing) but has plural pores over the entirety of the cutting surface, as shown in FIG. 1A (shown in black in the drawing), i.e., has many pores. The porous structure in the noodle according to the present invention comprises plural air-spaces in the following state.

The "porosity" refers to the ratio of the open area of the all air-spaces which accounts for the cross-section area when the noodle is cut in the direction orthogonal to the longitudinal direction. The porosity can be represented by the following formula. The "porosity" is the ratio of "the open area obtained by summing the open areas of the all air-spaces present in one cross-section of one piece of noodle" with respect to "the whole area of the cross-section, i.e., cross-sectional area". In the dried noodle, the porosity is from 0.1 to 15% in the cases when the noodle is cut at any position.

[Mathematical Formula 1]

$$\text{Porosity}\,(P) = \frac{\text{Open area of all air-spaces (mm}^2)}{\text{Cross-sectional area (mm}^2)} \times 100$$

$$0.1 \le P \le 15\%$$

The "unit porosity" used here is the ratio of the open area of one air-space which accounts for the cross-sectional area obtained when the noodle is cut in the direction orthogonal to the longitudinal direction. The "unit porosity" is the ratio of "the open area of one air-space" as a minimum unit with respect to "the whole area of one cross-section of one piece of noodle, i.e., cross-sectional area". In the dried noodle, the unit porosity is from 0.01 to 1% in the cases when the noodle is cut at any position.

[Mathematical Formula 2]

$$\text{Unit porosity}\,(M) = \frac{\text{Open area of all air spaces (mm}^2)/\text{Number of air-spaces}}{\text{Cross-sectional area (mm}^2)} \times 100$$

$$0.01\% \le M \le 1\%$$

In the dried noodle under such conditions, the porous structure in the dried noodle may be a structure that does not have large voids but has many pores over the entirety of the cutting surface as mentioned above, in the cases when the noodle is cut at any position, as shown by the above-mentioned porosity and unit porosity.

For example, in the dried noodle according to an embodiment, the pore having the smallest size among the many pores existing in one cross-section, i.e., "the smallest air-space existing in the cross-section of the noodle" may have, for example, a size larger than 0.03 mm that is the detection limit value in the case of an observation at 25 times magnification. The "smallest air-space existing in the cross-section of the noodle" may be represented by, for example, a ratio "Rmin" mentioned below, with respect to "the whole area of one cross-section of one piece of noodle, i.e., cross-sectional area". For example, Rmin may be 0.04%.

$$Rmin = \frac{\text{Open area of minimum air-space (mm}^2)}{\text{Cross-sectional area (mm}^2)} \times 100 \quad \text{[Mathematical Formula 3]}$$

Basically, the pore having the largest size among the many pores existing in one cross-section, i.e., "the largest air-space existing in the cross-section of the noodle" may have a size satisfying that the cross-section of the noodle does not have large voids as in FIG. 1B but may have plural pores, i.e., many pores, through the entirety of the cutting surface as shown in FIG. 1A. In the dried noodle according to an embodiment, the pore having the largest size among the pores existing in one cross-section, i.e., "the largest air-space existing in the cross-section of the noodle" may be represented by, for example, a ratio "Rmax" as shown below with respect to "the whole area of one cross-section of one piece of noodle, i.e., cross-sectional area".

$$Rmax = \frac{\text{Open area of maximum air-space (mm}^2)}{\text{Cross-sectional area (mm}^2)} \times 100 \quad \text{[Mathematical Formula 4]}$$

Rmax may be increased or decreased depending on the composition of the noodle dough. For example, Rmax may be 7 or 5%.

The dried noodle may have a gelatinization degree of 30 to 75%, or the gelatinization degree may be 40 to 75% or 50 to 75%. The gelatinization degree may be measured by a glucoamylase method or a mutarotase-GOD method.

The air-spaces in the cross-section of the noodle are produced depending on the pores existing in the porous structure. Such porous structure provides excellent texture with elasticity. Furthermore, due to such porous structure, it is possible to reconstitute the dried noodle quickly in hot water.

The dried noodle can be produced, for example, as follows. First, a noodle dough comprising a main raw material and a powder oil, which is entirely derived from an oil, in an amount of more than approximately 0.5% by weight and less than approximately 6% by weight with respect to the total weight of the main raw material is prepared. From this noodle dough, a raw noodle body having a desired shape is made by any means known per se. The obtained raw noodle body is treated, for example, at approximately 90° C. to approximately 150° C. for approximately 3 minutes to approximately 20 minutes. Alternatively, it can also be produced as follows. After conducting the foaming and drying of the above-mentioned raw noodle body at approximately 120° C. to approximately 150° C. for approximately 1 minute to approximately 4 minutes, the noodle body may further be dried, or foamed and dried at a temperature lower than the above-mentioned temperature. For example, the temperature lower than approximately 120° C. to approximately 150° C. may be, for example, approximately 120° C. or less, approximately 50° C. to approximately 120° C., approximately 70° C. to approximately 120° C., or approximately 90° C. to approximately 120° C.

For example, the foaming and drying may be achieved by a treatment under a condition at approximately 120° C. to approximately 150° C. (i.e., a first treatment) and a subsequent treatment under a condition at approximately 50° C. to approximately 120° C. (i.e., a second treatment). The treatment time may be approximately 3 minutes to approximately 20 minutes as the total of the time for the first treatment and the time for the second treatment. By the first and second treatments, a dried noodle having the specific features according to the present invention and a fine quality can be finally obtained. Furthermore, the formation of the porous structure may be completed during the first treatment and only drying may be conducted in the subsequent second treatment, or the porous structure may be formed over the both of the first and second treatments. In this case, at the initial stage of the second treatment, the porous structure is formed and drying proceeds, and after the porous structure has been formed, only drying would further proceed.

As mentioned above, this dried noodle may be produced by a single stage drying treatment in which a certain temperature condition is maintained, or may be produced by a multi-stage drying treatment in which the dried noodle is controlled under two or more temperature conditions.

The shape of the raw noodle body may be any of embodiments that are generally known as noodles, depending on the form of a final product such as a Chinese noodle, a pasta, an udon noodle and a soba noodle. For example, in the cases of a Chinese noodle, pasta, an udon noodle and a soba noodle, and the like, the shape may be string-like. In this case, the "raw noodle body" may be called "a raw noodle string". Alternatively, the form may be any form that is suitable for any of desired pasta or Chinese noodle known to persons skilled in the art.

The "main raw material" may be, but is not limited to, for example, wheat flours such as hard wheat flour, semi-hard wheat flour, soft wheat flour and durum semolina wheat, and any of cereal flours known per se including rice powder and corn powder, for example, starches of *Solanum tuberosum* L. such as potato, sugar cane and tapioca, and processed starches that are obtained by processing these by a means known per se, and the like.

The noodle dough may further comprise water, salt and/or other additives besides the main raw material. Examples of other additives include, but are not limited to, Kansui (brine), vegetable proteins, egg powder, yam powder, emulsifiers, polysaccharide thickeners, pigments and additives known per se which can be generally used as food additives. The additive may be selected depending on the characteristic of the final product such as the kind of the noodle such as Chinese-style, Japanese-style and European-style noodles.

The Kansui refers to mixtures of one kind or two kinds or more of potassium carbonate, sodium carbonate, sodium hydrogen carbonate and potassium salts or sodium salts of phosphoric acids which comply with the Standard of Elements as a raw material, or aqueous solutions or dilutions with wheat flour thereof (Japanese Food Additives Standards based on the Food Sanitation Act). In the process for the production of the dried noodle, a Kansui that satisfies the requirements of the above-mentioned Standard of Elements can be used. Alternatively, it is also possible to use an alternate substance as long as it exhibits an action as a Kansui, or to use the Kansui and the alternate substance in combination. The incorporation ratios of the cereal powder, salt, water and other additives are not specifically limited.

The powder oil, which is entirely derived from an oil, may be a powder oil produced by urine as a raw material any of edible oils known per se such as vegetable oils such as palm oil, cottonseed oil, safflower oil, rice bran oil, coconut oil, palm kernel oil, rapeseed oil, corn oil, soybean oil, sesame oil and hydrogenated oils and ester-exchanged oils thereof. Such a powder oil may be included in the noodle dough in an amount of more than approximately 0.5% by weight and less than approximately 6% by weight, preferably approximately 0.75% by weight to approximately 5% by weight, more preferably approximately 1.0% by weight to approximately 4% by weight, with respect to the total weight of the main raw material.

Examples of the process for the production of the powder oil include, but are not limited to, any of processes known per se such as a spray-cooling process and a drum-flake process. The shape of the particle of the powder oil includes, but is not limited to, a spherical shape, a rod shape and a scale shape, and the like. The size of the particle of the powder oil may be adjusted depending on the diameter and form of the noodle to be produced, and the size of the cross-sectional area of the noodle.

For a preferable size of the powder oil in the case of a Chinese noodle having a general diameter, although the average particle size of the particles that are distributed at the maximum (i.e., at the peak of the particle distribution) may be of any size, it is preferably from approximately 150 μm to approximately 500 μm.

In a preferable embodiment, the dried noodle may be produced by, for example, foaming and drying at approximately 90° C. to approximately 130° C. for approximately 3 minutes to approximately 20 minutes a raw noodle string comprising approximately 20% by weight to approximately 50% by weight of moisture with respect to the total weight of the main raw material, and more than approximately 0.5% by weight and less than approximately 6% by weight of a powder oil that has been produced by a spray-cooling process with respect to the total weight of the main raw material, or may be dried up to a moisture content of 14.5% or less or 11% or less by forming a desired porous structure by foaming and drying at approximately 120° C. to approximately 150° C. for approximately 1 minute to approximately 4 minutes and further drying, or foaming and drying at a temperature of approximately 120° C. or less.

In this embodiment, the gelatinization of the starch included in the dried noodle may be achieved at any stage of the treatment at approximately 90° C. to approximately 130° C. for approximately 3 minutes to approximately 20 minutes, or may be achieved by the time the dried noodle has been dried up to a moisture content of 14.5% or less or 11% or less by the treatment at approximately 90° C. to approximately 130° C. for approximately 3 minutes to approximately 20 minutes. Alternatively, the gelatinization may be achieved at any time point of the drying to a moisture content of 14.5% or less or 11% or less by further drying, or foaming and drying at a temperature of approximately 50° C. to approximately 120° C. (the second treatment) after the foaming and drying for approximately 1 minute to approximately 4 minutes at approximately 120° C. to approximately 150° C. (the first treatment). Furthermore, in the two-stage treatment in which such first treatment and second treatment are conducted, the formation of the porous structure and the gelatinization of the starch may be achieved between approximately 120° C. and approximately 150° C. which is the first treatment, or may be achieved through the first treatment, and the treatment at approximately 50° C. to approximately 120° C. which is the second treatment. By such treatment, a gelatinization degree of 30 to 75%, 40 to 75%, or 50 to 75% is achieved, thereby a dried noodle having excellent texture that produces a smooth sensation during swallowing is provided.

The noodle dough may be formed by using any of means known per se. Materials comprising raw material and a powder oil which are generally required for the formation of a noodle dough may be, for example, kneaded. In the formation of a noodle dough, in general, moisture is present so as to knead materials. The amount of the moisture used may be a moisture content that is required for the formation of the noodle dough. For example, it may be any of conventional moisture contents per se, and for example, it may be approximately 20% by weight to approximately 50% by weight with respect to the total weight of the main raw material. In the case when a conventional dried noodle is produced, when a noodle dough having such moisture content, for example, a raw noodle body formed of a noodle dough comprising approximately 20% by weight to approximately 50% by weight is dried under conditions of a high temperature and a short time from the initiation of the drying, cracking and excess foaming are produced. Therefore, it was difficult to dry a conventional dried noodle under such high temperature and short time. However, according to the embodiment of the present invention, it is possible to dry a raw noodle body such as a raw noodle string at a higher temperature than that in the conventional process as mentioned above, from the initiation, of the drying. Even though such drying is conducted, cracking and excess foaming are difficult to produce in the dried noodle.

It is possible to achieve the foaming and drying by conducting a treatment at approximately 90° C. to approximately 150° C. for approximately 3 minutes to approximately 20 minutes in the state that airflow is present, or conducting a treatment by conducting the first treatment in the same state at approximately 120° C. to approximately 150° C. and then conducting the second treatment at a temperature of approximately 50° C. to approximately 120° C. so that the total treatment time of the first treatment and the second treatment becomes approximately 3 minutes to approximately 20 minutes. The temperature may be set by setting a temperature that is measured as the temperature in a drying field such as a drying chamber (generally referred to as "in a chamber"). Furthermore, it is possible to achieve the flowing of air by a means that is generally conducted so as to treat a noodle body uniformly or promote drying, and for example, a means that is utilized in general hot air drying of a dried noodle such as an airflow generating device, an air blower or the like may be utilized. In the case of air blowing, the airflow velocity therefor may be an airflow velocity that is generally conducted in the production of a dried noodle. For example, the airflow velocity may be approximately 1 m/s to approximately 70 m/s. Furthermore, other examples are approximately 1 m/s to approximately 30 m/s, approximately 5 m/s to approximately 15 m/s, approximately 8 m/s to approximately 13 m/s, approximately 9 m/s to approximately 11 m/s such as approximately 10 m/s. In other words, the foaming and drying may be conducted under a condition in which air is made to flow at high temperature of approximately 90° C. to approximately 150° C. In the early stage in which the raw noodle body is put under the condition in which air is made to flow at a high temperature of approximately 90° C. to approximately 150° C., foaming and gelatinization are mainly produced in the dough and a porous structure is formed, and at the same time, the drying and gelatinization of the dough proceed gradually. It is considered that this foaming is stopped together with the hardening of the noodle body associated with the drying, and further drying is proceeded subsequently. The gelatinization may be completed between the foaming and drying, or may be produced during the additional period of drying. Similarly, in the case when the production is conducted by a two-step treatment of the first treatment and second treatment, the production may be conducted similarly under a condition in which air is made to flow. Depending on the treatment temperature and treatment time, the foaming, gelatinization, formation of a porous structure and drying are achieved at any of the stages.

Figure 2:
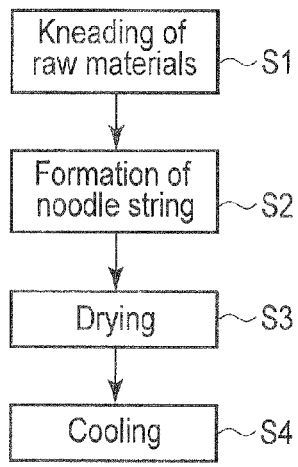
FIG. 2 is a scheme showing an example of the process for the production of the dried noodle.

Hereinafter an example of the process for the production of the dried noodle will be described. See FIG. 2.

First, raw materials for noodle dough are kneaded by a mixer to prepare a noodle dough (S1). Next, a raw noodle string is formed from the noodle dough by a noodle making machine (S2). This is dried in hot air at approximately 90° C. to approximately 150° C. (S3). This is cooled (S4).

The noodle dough may be prepared by kneading of the raw materials, and the kneading may be conducted by any of conventional methods known per se.

A raw noodle string may be formed from the prepared noodle dough by forming a belt-shaped noodle by rolling or the like, and thereafter cutting the noodle into a noodle string shape, or processing into a noodle string shape by using an extruder. As mentioned above, instead of the shape of a noodle string, the noodle dough may be formed into a noodle body having another shape. As the process for forming a noodle body of each shape, any means known per se may be used.

The present invention also encompasses a dried noodle produced by the production process. The dried noodle may generally be provided as an instant noodle.

The dried noodle may be provided in the state that it is accommodated in any container known per se such as a cup, a box or a packet. For example, the dried noodle may be provided after being enclosed in a small packet made of a resin as one meal, or plural meals may be enclosed in hulk into one packet made of a resin and provided. Alternatively, dried noodle(s) for one meal or plural meals may be enclosed in one packet together with a soup stock and/or soup ingredients which are respectively enclosed in small packets, and provided.

An example of the process for cooking the dried noodle is as follows. Water is boiled in a pan, the dried noodle is added thereto after the water has boiled, and the dried noodle is reconstituted by boiling while leaving or stirring the noodle for approximately 1 minute to approximately 5 minutes. Where desired, the hot water may be seasoned, and soup ingredients and/or cooked ingredients may be added to the hot water. Another example of the process for cooking is as follows. Water may be poured onto the dried noodle accommodated in a container and the dried noodle may be heated by microwaves by a microwave oven or the like, or may be heated by an ultralow-frequency wave by an induction heating cooking device or the like. However, the process is not limited by these, and the dried noodle may be cooked over a required time by a means known per se such as heating from water, heating in hot water and immersing in hot water.

The hot water may be seasoned by a cook by using any of seasonings known per se, or by using a dedicated soup stock. The soup stock may be a liquid-type concentrated soup stock or a powder soup stock.

Furthermore, since the dried noodle according to an embodiment of the present invention has a porous structure, it requires a short time for boiling and is excellent in restoration property and elasticity.

Furthermore, unlike conventional dried noodles, a viscid sensation during reconstitution by boiling is suppressed in the dried noodle according to an embodiment of the present invention, and thus it is not always necessary to stir the noodle or wash the noodle with water during cooking. This is because the gelatinization degree of the starch becomes 30 to 75% by the heat during drying, thereby the elusion of the starch that causes a viscid feeling is suppressed. In addition, since a viscid sensation is suppressed, it is possible to use the hot water directly as a soup without washing the noodle with water.

EXAMPLES

Hereinafter the present invention will further be explained with reference to Examples shown below. In the following Examples, the unit "%" is % by weight in all instances.

Preparation Examples

Example 1

1,000 g of wheat flour as a main raw material, and 20 g (2% with respect to the wheat flour) of a spherical powder oil in which particles distributing at the maximum have an average particle size of 150 to 250 μm were put in a mixer. 300 g (30% with respect to the wheat flour) of water was prepared separately, 20 g of salt and 5 g of Kansui were added thereto and dissolved by stirring, the solution was put into the mixer, and kneading was conducted to give a noodle dough. The noodle dough was then rolled by rolls according to a conventional process so as to have a thickness of 1.20 mm, and cut by a square cutter No. 20 to form a raw noodle string having a width of 1.5 mm.

This raw noodle string is cut into fixed quantities, accommodated in a retainer and dried in hot air at a temperature of 130° C. and an airflow velocity of 10 m/s for 5 minutes to give a dried noodle of Example 1. All of the temperatures described in Preparation Examples are temperatures that were set as temperatures inside a chamber for drying.

The obtained dried noodle of Example 1 had a gelatinization degree of 71.7%. An enlarged drawing of the cross-section of the dried noodle of Example 1 is shown in FIG. 1A. The cross-section represented a porous structure in which plural small vacuoles are present over the whole area (FIG. 1A).

Example 2-1-1

Example in which Drying Temperature was Changed; Part 1

A dried noodle was produced by using similar materials to those in Example 1 in a similar manner to that in Example 1 except that hot-air drying was conducted at a temperature of 90° C. for 20 minutes, and was designated as Example 2-1-1. The obtained dried noodle of Example 2-1-1 had a gelatinization degree of 34.4%.

Example 2-1-2

Example in which Drying Temperature was Changed; Part 2

A dried noodle was produced by using similar materials to those in Example 1 in a similar manner to that in Example 1 except that hot-air drying was conducted at a temperature of 105° C. for 11 minutes, and was designated as Example 2-1-2.

Example 2-1-3

Example in which Drying Temperature was Changed; Part 3

A dried noodle was produced by using similar materials to those in Example 1 in a similar manner to that in Example 1 except that hot-air drying was conducted at a temperature of 110° C. for 9 minutes, and was designated as Example 2-1-3.

Example 2-1-4

Example in which Drying Temperature was Changed; Part 4

A dried noodle was produced by using similar materials to those in Example 1 in a similar manner to that in Example 1 except that hot-air drying was conducted at a temperature of 115° C. for 5 minutes, and was designated as Example 2-1-4.

Example 2-1-5

Example in which Drying Temperature was Changed; Part 5

A dried noodle was produced by using similar materials to those in Example 1 in a similar manner to that in Example 1 except that hot-air drying was conducted at a temperature of 120° C. for 4 minutes and 30 seconds, and was designated as Example 2-1-5.

Example 2-1-6

Example in which Drying Temperature was Changed; Part 6

A dried noodle was produced by using similar materials to those in Example 1 in a similar manner to that in Example 1 except that hot-air drying was conducted at a temperature of 130° C. for 3 minutes, and was designated as Example 2-1-6.

Examples in which Two-Step Drying was Conducted; Parts 1 to 13

Example 2-2

A dried noodle was produced by using similar materials to those in Example 1 in a similar manner to that in Example 1 except that hot-air drying was conducted under a first condition at a temperature of 150° C. and an airflow velocity of 10 m/s for 1 minute and 30 seconds and a subsequent second condition at a temperature of 120° C. and an airflow velocity of 10 m/s for 3 minutes, and was designated as Example 2-2. The obtained dried noodle of Example 2-2 had a gelatinization degree of 56.4%.

Example 2-3

A dried noodle was produced by using similar materials to those in Example 1 in a similar manner to that in Example 1 except that hot-air drying was conducted under a first condition at a temperature of 130° C. and an airflow velocity of 10 m/s for 2 minutes and a subsequent second condition at a temperature of 120° C. and an airflow velocity of 10 m/s for 4 minutes, and was designated as Example 2-3. The dried noodle of Example 2-3 had a gelatinization degree of 50.8%.

Example 2-4-1 to Example 2-4-11

Dried noodles were produced by using similar materials to those in Example 1 in a similar manner that in Example 1 except that hot-air drying was each conducted at a temperature of 120° C. for 3 minutes or 4 minutes, at a temperature of 130° C. for 2 minutes or 2 minutes and 30 seconds, or at a temperature of 135° C. for 1 minute and 30 seconds or 2 minutes, or at a temperature of 140° C. for 1 minute and 30 seconds or 2 minutes, or at a temperature of 145° C. for 1 minute and 30 seconds or 1 minute and 50 seconds, or at temperature of 150° C. for 1 minute and 30 seconds, as the first condition, followed by a condition under which the total treatment time for the first and second hot-air drying became 3 minutes to 20 minutes, each at a temperature of 120° C. or less, as the subsequent second condition, and the dried noodles were designated as Example 2-4-1, Example 2-4-2, Example 2-4-3, Example 2-4-4, Example 2-4-5, Example 2-4-6, Example 2-4-7, Example 2-4-8, Example 2-4-9, Example 2-4-10, Example 2-4-11 and Example 2-4-12, respectively.

Example 2-5-1 to Example 2-5-8

Examples in which Drying Temperature was Changed

Dried noodles were produced by using similar materials to those in Example 1 in a similar manner to that in Example 1 except that hot-air drying was conducted by each conducting drying at a temperature of 150° C. for 1 minute, or at a temperature of 145° C. for 1 minute, or at a temperature of 140° C. for 1 minute, or at a temperature of 135° C. for 1 minute, or at a temperature of 130° C. for 1 minute or 1 minute and 30 seconds, or at temperature of 120° C. for 1 minute or 1 minute and 30 seconds, as the first condition, followed by a condition under which the total treatment time for the first and second hot-air drying became 3 minutes to 20 minutes each at a temperature of 120° C. or less, as the subsequent second condition, and the dried noodles were designated as Example 2-5-1 to Example 2-5-8, respectively.

Example 3

Example in which Particle Diameter of Powder Oil was Changed, Part 1

A dried noodle was produced by using similar materials to those in Example 1 in a similar manner to that in Example 1 except that the powder oil added had an average particle diameter of 150 μm or less, and was designated as Example 3.

Example 4

Example in which Particle Diameter of Powder Oil was Changed, Part 2

A dried noodle was produced by using similar materials to those in Example 1 in a similar manner to that in Example 1 except that the powder oil added had an average particle diameter of 250 to 500 µm or less, and was designated as Example 4.

Example 5

Example in which Particle Diameter of Powder Oil was Changed, Part 3

A dried noodle was produced by using similar materials to those in Example 1 in a similar manner to that in Example 1 except that the powder oil added had an average particle diameter of 500 µm or more, and was designated as Example 5.

Examples 6 to 11

Examples in which Addition Amount of Powder Oil was Changed

Dried noodles were produced by using similar materials to those in Example 1 except that the addition amounts of the powder oil added were 7.5, 10, 15, 30, 40 and 50 g, respectively, in a similar manner to that in Example 1 except that the airflow velocity was 15 m/s. These were designated as Examples 6 to 11.

Example 12

Example in which Addition Amount of Powder Oil was Changed and Drying Temperature was Changed A dried noodle was produced by using similar materials to those in Example 1 except that the addition amounts of the powder oil added were 6 and 50 g, respectively, in a similar manner to that in Example 1 except that the conditions for hot air drying were temperatures of 130 and 90° C. and an airflow velocity of 5 m/s. This was designated as Example 12.

Example 13

Example in which Scale-Like Oil was Used

A dried noodle was produced by using similar materials to those in Example 1 except that 20 g of a scale-like powder oil was added, in a similar manner to that in Example 1, and was designated as Example 13.

Comparative Examples

Comparative Example 1

Example in which Powder Oil was not Added and Drying Temperature was Changed A dried noodle was produced by using similar materials to those in Example 1 except that a powder oil was not added, in a similar manner to that in Example 1 except that the conditions for hot air drying were temperatures of 130 and 90° C. and an airflow velocity of 5 m/s. This was designated as Comparative Example 1.

Comparative Example 2

Example in which Semi-Solid Palm Oil was Used

A dried noodle was produced by using similar materials to those in Example 1 except that 20 g of a palm oil was used instead of the powder oil in a similar manner to that in Example 1. This was designated as Comparative Example 2.

Comparative Example 3

Example without Oil

A dried noodle was produced by using similar materials to those in Example 1 except that a powder oil was not added, in a similar manner to that in Example 1, and was designated as Comparative Example 3.

Comparative Example 4

Example in which Liquid-Like Refined Rice Oil was Used

A dried noodle was produced by using similar materials to those in Example 1 except that 20 g of a refined rice oil was used instead of the powder oil in a similar manner to that in Example 1. This was designated as Comparative, Example 3.

Comparative Example 5

Example in which Steaming was Conducted

A dried noodle was produced by using similar materials to those in Example 1 in a similar manner to that, in Example 1 except that steaming was conducted at 0.5 kg/cm$^2$ for 3 minutes prior to conducting drying. This was designated as Comparative Example 5.

Comparative Examples 6 and 7

Examples in which Addition Amount of Oil was Changed

Dried noodles were produced by using similar materials to those in Example 1 except that the addition amounts of the powder oil added were 5 and 60 g, respectively, in a similar manner to that in Example 1 except that the airflow velocity was 15 m/s. These were designated as Comparative Examples 6 and 7, respectively.

Comparative Example 8

Commercially Available Dried Noodle

A general commercially available dried noodle (size of cross-section: 1.15 mm×1.50 mm, shape of cross-section:

rectangular) that was produced by a conventional method was designated as Comparative Example 8. This is a Chinese noodle for which a cooking time of 3 minutes is recommended by the manufacturer.

Comparative Example 9

Commercially Available Instant Non-Fried Noodle

A general commercially available instant non-fried noodle (size at cross-section: 1.00 mm×1.50 mm, shape of cross-section: rectangular) enclosed in a packet which was produced by a conventional method was designated as Comparative Example 9. This is a Chinese noodle for which a cooking time of 3 minutes is recommended by the manufacturer.

Comparative Example 10

Commercially Available Instant Fried Noodle

A general commercially available instant fried noodle (size of cross-section: 1.80 mm×1.80 mm, shape of cross-section: rectangular) enclosed in a packet which was produced by a conventional method was designated as Comparative Example 10. This is a Chinese noodle for which a cooking time of 3 minutes is recommended by the manufacturer.

Comparative Examples 11 to 20

Examples in which Drying Temperature was Changed

Dried noodles were obtained by using similar materials to those in Example 1, and conducting hot-air drying by conducting, as the first condition, drying at a temperature of 160° C. for 1 minute to 2 minutes and 30 seconds, at a temperature of 150° C. for 2 minutes or 2 minutes and 30 seconds, or at a temperature of 145° C. for 2 minutes or 2 minutes and 30 seconds, or at a temperature of 140° C. for 2 minutes and 30 seconds, or at a temperature of 135° C. for 2 minutes and 30 seconds, respectively, and were designated as Comparative Examples 11 to 20.

<Comparative Tests>

Comparative tests were conducted for Examples 1 to 13 and Comparative Examples 1 to 20 that were produced as mentioned above.

Test 1. Consideration to Porous Structure of Noodle

The porous structures of the dried noodles were compared by changing the drying temperature of the noodle and the addition amount of the powder oil. Commercially available dried noodles were also investigated. The results thereof are shown in Table 1. The observation was conducted by using a microscope manufactured by Olympus Corporation (Olympus, SZH-ILLB) at 25 times magnification. The detection limit is 0.03 mm or more. Therefore, since pores having a size equal to or less than the detection limit cannot be observed, the result in the case when an observation was impossible is indicated as "0.00" in the following table.

TABLE 1

Effect on porous structure by differences in incorporation ratio of powder oil and drying temperature

| Conditions | Example Example 12 | | | | Comparative Examples 1 | | Comparative Examples 8 (commercially available dried noodle) |
|---|---|---|---|---|---|---|---|
| Incorporation ratio of powder oil (%) | 0.6 | 0.6 | 5 | 5 | 0 | 0 | 0 |
| Drying temperature (° C.) | 130 | 90 | 130 | 90 | 130 | 90 | — |
| Porosity (%) average of 10 examples | 5.92 | 1.50 | 3.46 | 2.12 | 10.84 | 0.00 | 0.00 |
| MAX | 9.85 | 1.64 | 5.05 | 3.86 | 12.21 | 0.00 | 0.00 |
| MIN | 4.22 | 0.26 | 2.00 | 0.42 | 10.04 | 0.00 | 0.00 |
| Unit porosity (%) average of 10 examples | 0.28 | 0.17 | 0.23 | 0.27 | 1.49 | 0.00 | 0.00 |
| MAX | 0.93 | 0.33 | 0.34 | 0.64 | 2.03 | 0.00 | 0.00 |
| MIN | 0.17 | 0.08 | 0.09 | 0.06 | 1.12 | 0.00 | 0.00 |

Here, for the column of "Average of 10 examples" in "Porosity" shows an average value that was obtained from the values of the porosities that were respectively obtained for 10 cross-sections. The "MAX" in Porosity shows the value of the porosity for the cross-section that showed the maximum porosity among the porosities that were respectively obtained for the 10 cross-sections. The "MIN" in Porosity shows the value of the porosity for the cross-section that showed the minimum porosity among the porosities that were respectively obtained for the 10 cross-sections.

The column of "Average of 10 examples" in "Unit porosity" shows an average value that was obtained from the values of unit porosities that were respectively obtained for the 10 cross-sections. The "MAX" in Unit porosity shows the value of the unit porosity for the cross-section that showed the maximum unit porosity among the unit porosities that were respectively obtained for the 10 cross-sections. The "MIN" in Unit porosity shows the value of the unit porosity for the cross-section that showed the minimum unit porosity among the unit porosities that were respectively obtained for the 10 cross-sections.

Test 2. Comparison of Gelatinization Degrees by Difference in Drying Temperature The gelatinization degrees were compared by changing the drying temperature of the noodle. The results thereof are shown in Table 2. The gelatinization degree as used herein is not an average value of several samples but the maximum value. In addition, the lowest gelatinization degree was not less than 30% in all of the samples of the respective Examples.

in all cases, i.e., Examples 1, 3 to 5 and 13. The finest evaluation of tasting could be obtained in the cases of Examples 1 and 4.

TABLE 2

| Conditions | Example 1 | Example 2-1-1 | Example 2-2 | Example 2-3 | Comparative Example 8 (commercially available dried noodle) |
|---|---|---|---|---|---|
| Drying temperature (° C.) | 130 | 90 | 150→120 | 130→120 | — |
| Gelatinization degree (%) Maximum value | 71.7 | 34.4 | 56.4 | 50.8 | 28.2 |

Test 3. Effects by Difference in Property of Powder Oil

An effect of suppressing excess foaming (i.e., whether or not the hollowing as in FIG. 1B is produced) was evaluated for the dried noodles in the cases when oils having different properties (i.e., solid, semi-solid or liquid) were used. Furthermore, a sensory test was conducted by tasting by panelists.

In the sensory test, Example 1 and Comparative Examples 2 to 4 were each put into a pan containing boiled water and boiled for 4 minutes, and thereafter evaluated by ten panelists, and the average evaluation is shown. The evaluation was conducted by a five-grade evaluation, i.e., a five-point scale by ten specialized panelists.

The scores are as follows;
5=very good, 4=slightly good, 3=good, 2=slightly bad, 1=bad The results thereof are shown in Table 3. As the results thereof, a significantly excellent effect was observed on the effect of suppressing excess foaming in the noodles for which the powder oil was used. Furthermore, in the evaluation by tasting, there was no fine dried noodle other than the cases when the powder oil was used.

TABLE 3

Effects by difference in property of powder oil

| | | Addition amount | Effect of suppressing excess foaming | Evaluation of tasting |
|---|---|---|---|---|
| Example 1 | Powder oil (solid) | 2% | 5 | 5 |
| Comparative Example 3 | Not added | — | 1 | 1 |
| Comparative Example 2 | Palm oil (semi-solid) | 2% | 1 | 1 |
| Comparative Example 4 | Refined rice oil (liquid) | 2% | 1 | 1 |

Test 4. Comparison of Effects Due to Differences in Shape and Particle Diameter of Powder Oil Spherical powder oils having different particle sizes were used. The powder oils used were oils having a small diameter (average particle size: 150 μm>), a middle diameter (average particle size: 150 μm to 500 μm) and a large diameter (average particle size: 500 μm<), and a scale-like oil and a liquid oil. Tests were conducted on Examples 1, 3 to 5 and 13 in similar manners to those in Test 2. The results are shown in Table 4. As the results thereof, a fine effect of suppressing excess foaming could be obtained in all of Examples 1, 3 to 5 and 13. No difference was observed in the effects of suppressing excess foaming by the differences in the average particle size of the spherical oil and the shape of the powder oil. Fine evaluations of tasting could be obtained

TABLE 4

Comparison of average particle diameters and shapes of powder oils

| | Powder oil (spherical) <particle diameter> | Addition amount | Effect of suppressing excess foaming | Evaluation of tasting |
|---|---|---|---|---|
| Example 3 | 150 μm> | 2% | 5 | 4 |
| Example 1 | 150 μm to 250 μm | 2% | 5 | 5 |
| Example 4 | 250 μm to 500 μm | 2% | 5 | 5 |
| Example 5 | 500 μm< | 2% | 5 | 4 |
| Example 13 | Powder oil (scale-like) | 2% | 5 | 4 |

Test 5. Comparison of Effects by Difference in Addition Amount of Powder Oil

A comparison was conducted in a similar manner to that in Test 2 by changing the addition amount of the powder oil. The results thereof are shown in Table 5.

In the case when 0.5% of the powder oil was added, a preferable effect could not be obtained. On the other hand, an effect of suppressing excess foaming could be observed when 0.75% of the powder oil was added. When the amount exceeded 6%, the addition amount became excess and the evaluation of tasting was lowered.

TABLE 5

Comparison of differences in effect by addition amount of powder oil

| | | Addition amount | Effect of suppressing excess foaming | Evaluation of tasting |
|---|---|---|---|---|
| Comparative Example 6 | Powder oil (spherical) | 0.5% | 3 | 3 |
| Example 6 | | 0.75% | 5 | 4 |
| Example 7 | | 1% | 5 | 5 |
| Example 8 | | 1.5% | 5 | 5 |
| Example 9 | | 3% | 5 | 5 |
| Example 10 | | 4% | 5 | 5 |
| Example 11 | | 5% | 5 | 4 |
| Comparative Example 7 | | 6% | 5 | 3 |

Test 6. Comparison of Textures by the Presence or Absence of Steaming

Textures were compared by the presence or absence of steaming in a similar manner to that in Test 2. The results thereof are shown in Table 6. In the case of Comparative Example 5 in which steaming was conducted, an effect of suppressing excess foaming during drying could not be obtained.

The reason is considered to be that the powder oil was molten by the steaming and in a state that is close to the case when a liquid oil is added to a noodle dough. Furthermore, with respect to the texture, in the case when steaming was conducted, the noodle had hardness with strong elasticity without stickiness instead of soft texture with stickiness.

TABLE 6

Comparison of presence or absence of steaming

|  | | Addition amount | Effect of suppressing excess foaming | Evaluation of tasting |
|---|---|---|---|---|
| Example 1 | Not steamed | 2% | 5 | 5 |
| Comparative Example 5 | Steamed | 2% | 1 | 4 |

Test 7-1. Relationship Between Temperature Condition of 90 to 130° C. and Treatment Time It was proved by measurements and observations that the dried noodles produced in Example 2-1-1 to Example 2-1-6 each had a preferable porous structure, had a preferable appearance without burning, and had a fine quality. The results thereof are shown in Table 7. The circles in the table indicate the conditions under which a fine porous structure was formed and a dried noodle with a fine quality could be obtained.

TABLE 7

<States of dried noodles when dried at 90 to 130° C.>

| Treatment time | Temperature condition | | | | | |
|---|---|---|---|---|---|---|
|  | 130° C. | 120° C. | 115° C. | 110° C. | 105° C. | 90° C. |
| 20 min | — | — | — | — | — | ○ Example 2-1-1 |
| 11 min | — | — | — | — | ○ Example 2-1-2 | — |
| 9 min | — | — | — | ○ Example 2-1-3 | — | — |
| 5 min | — | — | ○ Example 2-1-4 | — | — | — |
| 4 min 30 sec | — | ○ Example 2-1-5 | — | — | — | — |
| 3 min | ○ Example 2-1-6 | — | — | — | — | — |

Test 7-2. Consideration for States of Dried Noodles Treated at 120 to 160° C. and then Treated at 50 to 120° C.

The results of the observation of the appearances and formation of pores for the dried noodles produced in Example 2-4-1 to Example 2-4-12 and Comparative Example 11 to Comparative Example 20, i.e., in the cases when the noodle was treated at a high temperature of 120° C. or more as the first treatment, and subsequently treated at a temperature of 120° C. or less as the second treatment, are shown in Table 8. The temperature conditions for the second treatment are described in the lowest line and the line on that line in Table 8, and the value that represents the time in the brackets in each column for the examples in which the second treatment was conducted shows the treatment time of the second treatment. For Example 2-4-9, Example 2-4-10 and Example 2-4-12 in which the first temperature condition is 145° C., the second treatment temperature was described in the brackets.

(160° C.)

Here, in the treatment conducted at a temperature of 160° C. as the first treatment, burning was produced in the appearance even by a short treatment for 2 minute and 30 seconds or less. These noodles were judged to be unpreferable at the time point when burning was produced in the first treatment (Comparative Examples 11 to 14).

The treatment conducted at a temperature of 150° C. as the first treatment was judged to be unpreferable at the time point of the treatment for 2 minutes or more since burning was produced in the appearance (Comparative Examples 15 and 16).

(150° C.)

In the first treatment at 150° C. for 1 minute and 30 seconds or less, burning was not observed in the appearance, and this was further treated at 120° C. for 3 minutes as the second treatment (Example 2-4-11). By such treatments, a suitable noodle of the present invention could be obtained.

When the first treatment was conducted at 150° C. for 1 minute as the first treatment and a treatment as the second treatment was conducted at 50 to 120° C. for 2 minutes to 19 minutes, a suitable porous structure could not be obtained at the time point when the first treatment had been conducted, but a fine dried noodle can be obtained by further conducting the second treatment (Example 2-5-1).

(145° C.)

The treatment conducted at a temperature of 145° C. as the first treatment was judged to be unpreferable at the time point of the treatment for 2 minutes or more since burning was produced in the appearance (Comparative Examples 17 and 18).

In the first treatment at 145° C. for 1 minute and 30 seconds, burning was not observed in the appearance, and this was further dried at 120° C. for 3 minutes as the second treatment (Example 2-4-9). By such treatments, a suitable noodle of the present invention could be obtained.

In Examples 2-4-10 and 2-4-12 in which a treatment was conducted at 145° C. for 1 minute and 50 seconds as the first treatment and a treatment was conducted at 50° C. for 18 minutes and 10 seconds or at 70° C. for 15 minutes as the second treatment, suitable noodles of the present invention could be obtained. Although it is not shown in the data, a suitable porous structure of the present invention could not be obtained in the case when a treatment for 3 minutes to 20 minutes was conducted at a constant temperature of 50 or 70° C.

In Example 2-5-2 in which a treatment was conducted at 145° C. for 1 minute as the first treatment and a treatment was conducted at 50 to 120° C. for 2 minutes to 19 minutes as the second treatment, a suitable porous structure could not be obtained at the time point when the first treatment had been conducted, but a fine dried noodle can be obtained by further treating the second treatment for a time of 2 minutes to 19 minutes (Example 2-5-2).

(140° C.)

The treatment conducted at a temperature of 140° C. as the first treatment was judged to be unpreferable at the time point of the treatment for 2 minutes and 30 seconds since burning was generated on the appearance (Comparative Example 19).

In the first treatment at 140° C. for 2 minutes or 1 minute and 30 seconds, burning was not observed in the appearance, and this was further treated at 120° C. for 2 minutes or 3 minutes and 30 seconds as the second treatment (Example 2-4-8 and Example 2-1-7). By such treatments, suitable noodles of the present invention could be obtained.

In Example 2-5-3, a suitable porous structure could not be obtained at the time point when a treatment at 140° C. for 1 minute as the first treatment had been conducted, but a fine dried noodle can be obtained by further treating at 50 to 120° C. for a time of 2 minutes to 19 minutes as the second treatment (Example 2-5-3).

(135° C.)

The drying conducted at a temperature of 135° C. as the first treatment was judged to be unpreferable at the time point of the treatment for 2 minutes and 30 seconds since burning was produced in the appearance (Comparative Example 20).

In the first treatment at 135° C. for 1 minute and 30 seconds or 2 minutes, burning was not observed in the appearance, and this was further treated at 120° C. for 4 minutes and 30 seconds or 4 minutes as the second treatment (Example 2-4-5 and Example 2-4-6). By such treatments, suitable noodles of the present invention could be obtained.

In Example 2-5-4, a suitable porous structure could not be obtained at the time point when a treatment at 135° C. for 1 minute as the first treatment had been conducted, but a fine dried noodle can be obtained by further drying at 50 to 120° C. for a time of 2 minutes to 19 minutes as the second treatment (Example 2-5-4).

(130° C.)

In the treatment conducted at 130° C. for 2 minutes or 2 minutes and 30 seconds as the first treatment, burning was not observed in the appearance, and this was further dried at 120° C. for 4 minutes or 2 minutes respectively as the second treatment (Example 2-4-3 and Example 2-4-4). By such treatments, suitable noodles of the present invention could be obtained.

In Example 2-5-5 and Example 2-5-6, a suitable porous structure could not be obtained et the time point when a treatment at 130° C. for 1 minute or 1 minute and 30 seconds as the first treatment had been conducted, but fine dried noodles can be obtained by further drying at 50 to 120° C. for a time of 2 minutes to 19 minutes as the second treatment (Example 2-5-5 and Example 2-5-6).

(120° C.)

In the drying conducted at 120° C. as the first treatment, burning was not observed in the appearance by the treatment for 3 minutes or 4 minutes, and this was further dried at 90° C. for 3 minutes or 2 minutes respectively as the second treatment (Example 2-4-1 and Example 2-4-2). By such treatments, suitable noodles of the present invention could be obtained.

In Example 2-5-7 and Example 2-5-8, a suitable porous structure could not be obtained at the time point when a treatment at 120° C. for 1 minute or 1 minute and 30 seconds as the first treatment had been conducted, but fine dried noodles can be obtained by further conducting a treatment at 50 to 120° C. for a time of 2 minutes to 19 minutes as the second treatment (Example 2-5-7 and Example 2-5-8).

(Conclusion)

From the following results, as shown in Table 8, it is possible to produce a dried noodle according to the present invention even by drying treatments that are conducted under two continuous conditions with temperature conditions that differ from each other.

Furthermore, from these results, it is also possible to conduct the foaming of the noodle and the drying of the noodle by two steps with different temperature conditions. In other words, it is possible to obtain a fine noodle by foaming at a temperature of 120 to 150° C. and then drying at a temperature of 50 to 120° C. The data in Table 8 shows the average evaluation of the evaluations by six panelists. The respective symbols in the table indicate the conditions under which the following results were obtained;

White triangle: the condition under which a porous structure was formed but burning was produced in the appearance Black triangle: the condition under which a porous structure was formed but burning was present in the appearance, and drying was excessive Circle: the condition under which a fine porous structure was formed and the quality was fine X→circle: the condition under which a porous structure was not formed at the observation after the first treatment, but a porous structure was formed by conducting the subsequent second treatment at a temperature condition of 50 to 120° C. and the quality was fine.

TABLE 8

<States of dried noodles when treated at 120 to 160° C. and then treated at 50 to 120° C.>

| First treatment time | First temperature condition | | | | | | | (Second treatment time) |
|---|---|---|---|---|---|---|---|---|
| | 160° C. | 150° C. | 145° C. | 140° C. | 135° C. | 130° C. | 120° C. | |
| 4 min | — | — | — | — | — | — | ○ (2 min) Example 2-4-2 | (2 min) |
| 3 min | — | — | — | — | — | — | ○ (3 min) Example 2-4-1 | (3 min) |

TABLE 8-continued

<States of dried noodles when treated at 120 to 160° C. and then treated at 50 to 120° C.>

| First treatment time | First temperature condition | | | | | | | (Second treatment time) |
|---|---|---|---|---|---|---|---|---|
| | 160° C. | 150° C. | 145° C. | 140° C. | 135° C. | 130° C. | 120° C. | |
| 2 min 30 second | ▲ Comparative Example 14 | ▲ Comparative Example 16 | ▲ Comparative Example 18 | ▲ Comparative Example 19 | ▲ Comparative Example 20 | ○ (2 min) Example 2-4-4 | — | (2 min) |
| 2 min | ▲ Comparative Example 13 | ▲ Comparative Example 15 | ▲ Comparative Example 17 | ○ (2 min) Example 2-4-8 | ○ (4 min) Example 2-4-6 | ○ (4 min) Example 2-4-3 | — | (2 min to 4 min) |
| 1 min 50 second | — | — | ○ Example 2-4-10 (50° C.) ○ Example 2-4-12 (70° C.) | — | — | — | — | (18 min 10 second) (15 min) |
| 1 min 30 second | ▲ Comparative Example 12 | ○ (3 min) Example 2-4-11 | ○ (3 min) Example 2-4-9 (120° C.) | ○ (3.5 min) Example 2-4-7 | ○ (4.5 min) Example 2-4-5 | X→○ Example 2-5-6 | X→○ Example 2-5-8 | (3 min to 4.5 min) |
| 1 min | ▲ Comparative Example 11 | X→○ Example 2-5-1 | X→○ Example 2-5-2 (120° C.) | X→○ Example 2-5-3 | X→○ Example 2-5-4 | X→○ Example 2-5-5 | X→○ Example 2-5-7 | (2 min to 19 min) |
| | — | 120° C. | 50 to 120° C. | 120° C. | 120° C. | 120° C. | 90° C. | |
| | | | Second temperature condition | | | | | |

Test 8. Comparison of Example 1 with Commercially Available Dried Noodle, Instant Non-Fried Noodle and Instant Fried Noodle For the plural evaluation items relating to texture for the dried noodle of Example 1, and Comparative Example 8 (a commercially available dried noodle), Comparative Example 9 (a commercially available instant non-fried noodle) and Comparative Example 10 (a commercially available instant fried noodle), sensory evaluation was conducted by Quantitative Descriptive Analysis (QDA) (Journal of Japanese Society for Sensory Evaluation, Vol. 6, No 2. pp. 138-145, 2002). Example 1 was cooked in a similar manner to that in Test 2. Comparative Examples 8, 9 and 10 were each cooked by a standard cooking method recommended by the manufacturer, i.e., by reconstitution by boiling for 3 minutes.

The sensory evaluation according to the QDA as used is analytic sensory evaluation in which sensory evaluation by a standard QDA known per se is applied to the evaluation of noodle texture. The sensory evaluation method by the QDA is an objective evaluation method having a statistic reliability in which differences among individuals are minimized. The person who evaluates is a person who has been trained based on the QDA so as to be able to exert a similar accuracy to that exerted by an analyzer. For plural indices relating to texture such as elasticity and restoration property, data of numerical values was obtained. In order to grasp a comprehensive characteristic from those numerical value data, an analysis of the main component which is a statistic processing was conducted. The results thereof are shown in Table 3.

Figure 3:
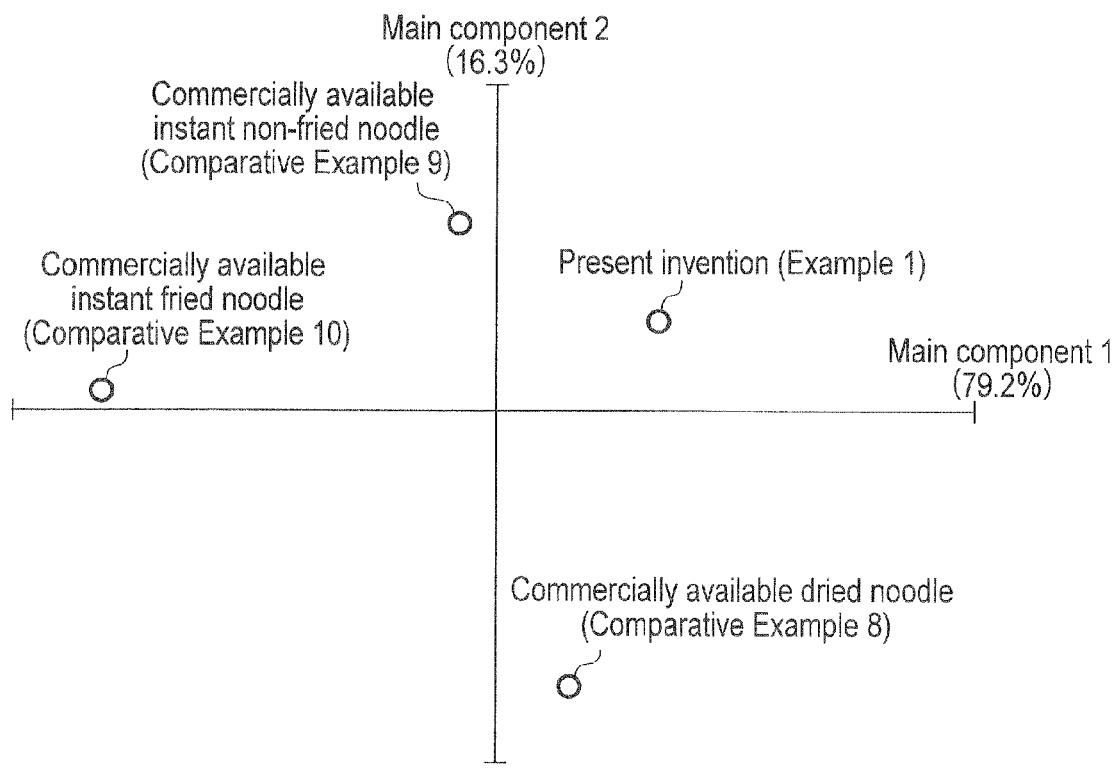
FIG. 3 is a drawing showing the evaluation of the dried noodle according to an embodiment of the present invention.

In the mapping shown in FIG. 3, the main component 1 represents an index relating to elastic force of texture and reconstitution by hot water, and the main component 2 represents an index relating to smoothness and change over time. By this evaluation, it was proved that the instant noodle according to the present invention has fine reconstitution and excellent texture such as a smooth sensation during swallowing which were not possessed by conventional instant noodles.

As shown in FIG. 3, the dried noodle according to the present invention could achieve the features that have not been achieved by any of conventional noodles. Therefore, it had quick reconstitution in hot water and flexible elastic force as in instant noodles (i.e., conventional non-fried noodles and conventional fried noodles) in combination while having the features of conventional dried noodles.

According to the present invention, a dried noodle that can be cooked finely in an easy manner within a short time, and a process for the production of the same are provided. Since such dried noodle can provide excellent quality and texture and can be cooked conveniently, it is widely accepted by consumers. It is widely used in the food industry.

What is claimed is:

1. A process for producing a dried noodle, wherein the dried noodle has a porosity in a cross-sectional area of the noodle of from 0.1 to 15%, a unit porosity in the cross-sectional area of the noodle of from 0.01 to 1%, a gelatinization degree of 30 to 75% and a porous structure, the process consisting essentially of:
    (a) preparing a noodle dough comprising a main raw material, water and a powder oil, which is entirely derived from an oil, in an amount of more than 0.5% by weight and less than 6% by weight with respect to a total weight of the main raw material,
    (b) forming a raw noodle body from the noodle dough, and
    (c) subjecting the raw noodle body to an airflow at a temperature of 90 to 150° C. to evaporate the water, thereby foaming, drying and gelatinizing the raw noodle body,
    wherein the entire process does not include steaming.

2. The process for producing a dried noodle according to claim 1, wherein the raw noodle body is a raw noodle string, and the foaming and drying are conducted for 3 minutes to 20 minutes.

3. The process for producing a dried noodle according to claim 1, wherein the addition amount of the powder oil is 0.75% by weight to 5% by weight with respect to the total amount of the main raw material.

4. The process for producing a dried noodle according to claim 2, wherein the addition amount of the powder oil is 0.75% by weight to 5% by weight with respect to the total amount of the main raw material.

5. The process for producing a dried noodle according to claim 1, wherein the foaming and drying are conducted by a first treatment at 120 to 150° C. and a subsequent treatment at 50 to 120° C.

* * * * *